United States Patent Office.

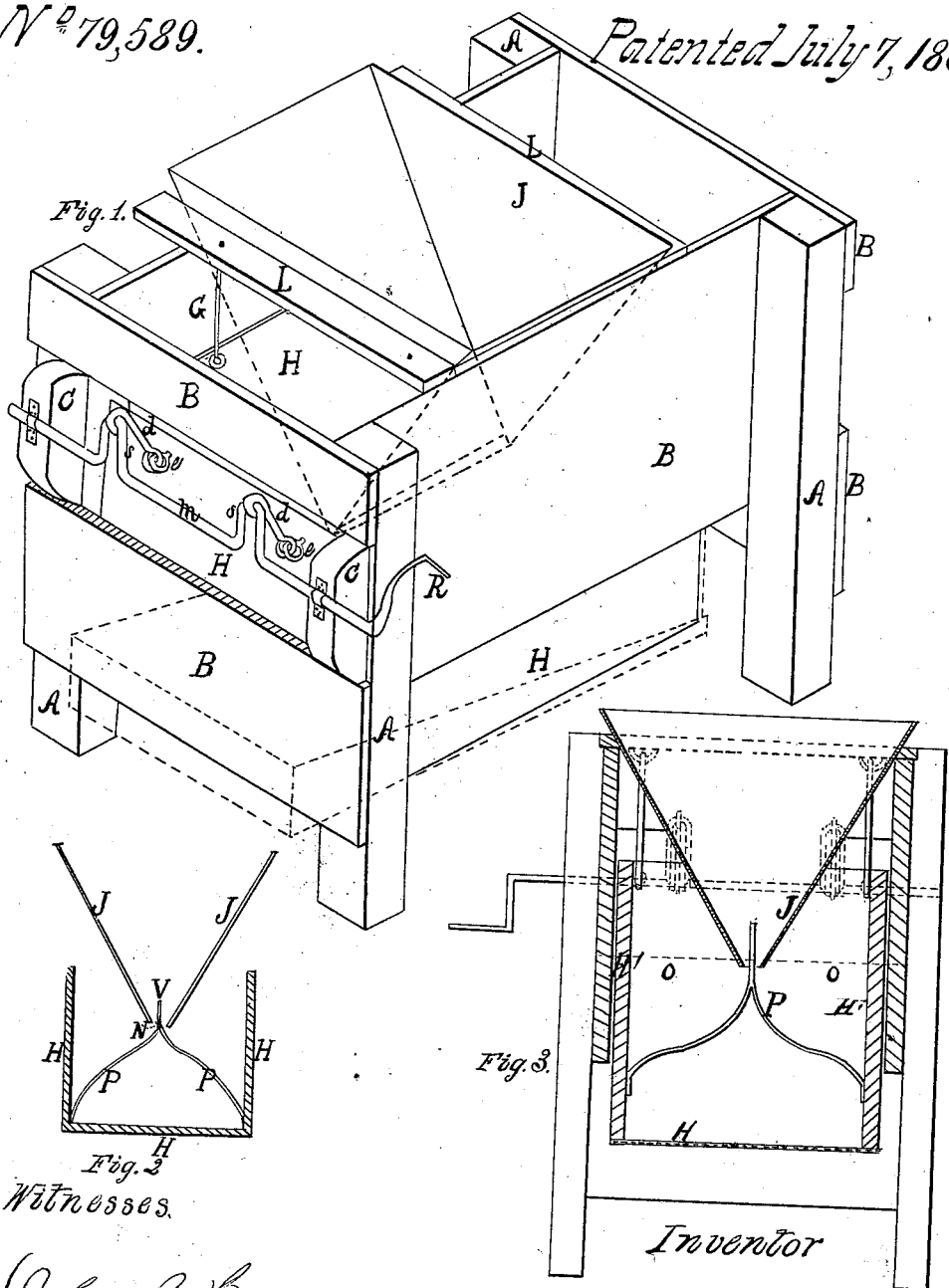

GEORGE MOHLER, OF YATES CITY, ILLINOIS.

Letters Patent No. 79,589, dated July 7, 1868.

IMPROVED SIEVE.

*The Schedule referred to in these Letters Patent and making part of the same.*

TO ALL WHOM IT MAY CONCERN:

Be it known that I, GEORGE MOHLER, of Yates City, county of Knox, and State of Illinois, have invented a new and improved Method of Operating Sieves; and I do hereby declare that the following is a full, clear and exact description thereof, which will enable others skilled in the art to make and use the same, reference being had to the accompanying drawings, forming part of this specification.

This invention relates to a new and improved arrangement for operating sieves, and the invention consists in suspending a sieve beneath a hopper, in connection with device for self-regulating the feed at the mouth of the hopper, and also an arrangement by which the sieve may be shaken as desired.

Figure 1 is a perspective view of the entire machine.

Figure 2 is a lateral section of the hopper, sieve-box, and feeder, on the line 35, fig. 1.

Figure 3 is another view.

Letters A A A A represent the four-corner post, and

B B B the boards attached thereto, for the purpose of forming a suitable frame.

L L represent cross-pieces on the top of the aforesaid frame.

J is the hopper, supported by the top of the frame and by the cross-pieces L L.

H is the box, in the bottom of which is placed any kind of sieve desired for different material. This box is suspended by four rods G from the cross-pieces L L, and the rods are so pivoted as to admit of the box having a free longitudinal movement.

M is the crank, attached to the main frame at the journals, by means of boxing or straps, and the blocks C C, and operated by the crank R. The rod M has also two cranks at S S. The cranks S S are connected to the box H by means of the links D D and eyes E E, in such way as to give a reciprocating rectilinear movement to the box H, by means of the rotary movement of the crank M.

The box H, as represented in fig. 1, is intended for use in sieving meal, flour, &c. For sieving sand and similar material, I use a box shown by the dotted red lines 2 3. The box 2 3 is suspended similar to the box H, only lowest at back or far end from crank M, and is also open at rear end to admit of coarser particles passing out. It also is extended forward of box A B at 2, in order to admit of throwing in the sand at that part instead of the hopper.

H H H, fig. 2, is the box with the sieve in the bottom.

P P represents a piece of hoop-iron or similar material, bent in such shape that it may be attached at the lower ends to the sides of the box H, and the upper ends form a point projecting into the bottom of the hopper J, to act as a feeder and regulator, by means of having the same motion as the box H.

J J, fig. 2, is a sectional view of the hopper. Meal or flour being thrown in this hopper, and the crank R rotated, giving a longitudinal movement to the box H, it will of course shake the material through the sieve, whilst the point P P will operate to keep it from choking in the hopper.

Having thus described my invention, what I claim as new, and desire to secure by Letters Patent, is—

The combination of the swinging and adjustable sieve H, and the conical-shaped feeder P, whose apex extends up into the slotted bottom of the hopper J, and operates with the box H' in the manner set forth.

GEORGE MOHLER.

Witnesses:
 JOHN R. HARTMAN,
 JOHN G. KING.